(12) United States Patent
Tsemekhman et al.

(10) Patent No.: US 10,417,658 B1
(45) Date of Patent: *Sep. 17, 2019

(54) METHODS, SYSTEMS, AND MEDIA FOR MANAGING ONLINE ADVERTISING CAMPAIGNS BASED ON CAUSAL CONVERSION METRICS

(71) Applicant: Integral Ad Science, Inc., New York, NY (US)

(72) Inventors: Kiril Tsemekhman, San Francisco, CA (US); Vadim Tsemekhman, Seattle, WA (US); Arun Ahuja, Stamford, CT (US)

(73) Assignee: Integral Ad Science, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/084,568

(22) Filed: Nov. 19, 2013

Related U.S. Application Data

(60) Provisional application No. 61/789,562, filed on Mar. 15, 2013, provisional application No. 61/728,130, filed on Nov. 19, 2012.

(51) Int. Cl.
*G06Q 30/02* (2012.01)

(52) U.S. Cl.
CPC ..... *G06Q 30/0246* (2013.01); *G06Q 30/0242* (2013.01)

(58) Field of Classification Search
CPC ........................................ G06Q 30/0207–0277
USPC .............................................. 705/14.1–14.73
See application file for complete search history.

(56) References Cited

U.S. PATENT DOCUMENTS

| | | | |
|---|---|---|---|
| 2003/0014304 A1* | 1/2003 | Calvert et al. | 705/14 |
| 2006/0041480 A1* | 2/2006 | Briggs | 705/14 |
| 2006/0224445 A1* | 10/2006 | Axe | G06Q 30/02 705/14.69 |
| 2008/0041480 A1 | 2/2008 | Peng | |

(Continued)

OTHER PUBLICATIONS

Office Action dated Mar. 18, 2016 in U.S. Appl. No. 14/716,241.

(Continued)

*Primary Examiner* — Sam Refai
(74) *Attorney, Agent, or Firm* — Byrne Poh LLP

(57) ABSTRACT

Methods, systems, and media for managing online advertising campaigns based on causal conversion metrics are provided. In some embodiments, the method comprises: receiving conversion information corresponding to test group including consumers that were presented with an advertisement using an advertising channel; receiving advertisement viewability information indicative of a probability that each of the consumers viewed the advertisement; determining that a subset of the consumers did not view the advertisement based on the probability; placing the consumers into a control group and a test group based on the probability corresponding to each of the consumers; calculating a causal conversion metric based on a comparison of the conversion information corresponding to consumers of the control group and conversion information corresponding to consumers of the test group; and determining whether to place an advertisement using the advertising channel based on the causal conversion metric.

18 Claims, 4 Drawing Sheets

(56) References Cited

U.S. PATENT DOCUMENTS

2011/0119126 A1* 5/2011 Park et al. ................ 705/14.45

OTHER PUBLICATIONS

Office Action dated Jul. 3, 2017 in U.S. Appl. No. 14/716,241.
Office Action dated Jul. 7, 2015 in U.S. Appl. No. 14/716,241.
Office Action dated Sep. 17, 2018 in U.S. Appl. No. 14/716,241.
Office Action dated Dec. 7, 2016 in U.S. Appl. No. 14/716,241.
Scharf, M., "Out-of-View Impressions Can Be Valuable", last updated Jan. 8, 2015, pp. 1-8, available at http://adexchanger.com/data-driven-thinking/out-of-view-impressions-can-be-valuable/, last accessed Jun. 9, 2016.
U.S. Appl. No. 13/614,878, filed Sep. 13, 2012.

\* cited by examiner

METHODS, SYSTEMS, AND MEDIA FOR MANAGING ONLINE ADVERTISING CAMPAIGNS BASED ON CAUSAL CONVERSION METRICS

CROSS-REFERENCE TO RELATED APPLICATIONS

This application claims the benefit of U.S. Provisional Application No. 61/728,130, filed Nov. 19, 2012, and U.S. Provisional Application No. 61/789,562, filed Mar. 15, 2013, each of which is hereby incorporated by reference herein in its entirety.

TECHNICAL FIELD

The disclosed subject matter relates to methods, systems, and media for managing online advertising campaigns based on causal conversion metrics.

BACKGROUND

The effectiveness of an online advertising campaign can be measured using various techniques. One technique includes measuring the conversion rate of the advertising campaign as a way of estimating whether the advertisements are effective at driving consumer behavior. A campaign conversion can generally be defined as a consumer being presented with an advertisement and then taking a particular action. Examples of actions that can be considered a campaign conversion include engagement with or clicking on the advertisement, accessing and/or browsing a web site of the advertiser, downloading and/or purchasing a product sold or provided by the advertiser, signing up for a subscription from the advertiser, providing information to be added to an advertiser's mailing list, etc.

As part of an online advertising campaign, an advertiser can use various advertising channels for delivering advertisements to consumers. For example, an advertiser can contact content publishers (e.g., news web sites, blogs, social networking websites, etc.) directly to arrange for advertisements associated with an advertising campaign to be presented to consumers (e.g., a direct publisher channel). In other examples, an advertiser can use programmatic advertising channels to buy and/or place advertisements. For example, an advertiser can contact a marketer who can arrange for advertisements to be shown on various web pages and/or arrange for advertisements to be placed in advertisement placements on one or more web sites through one or more real-time bidding exchanges. As another example of programmatic buying, an advertiser can contact a demand side platform that can arrange for advertisements to be placed in advertisement placements on one or more web sites through one or more real-time bidding exchanges. As yet another example of programmatic buying, an advertiser can use a real-time bidding exchange directly to bid on the opportunity to place advertisements.

When advertisements are delivered to consumers using these advertising channels, one or more targeting parameters can be used to target specific types of consumers. For example, advertisements can be delivered to specific consumers who fall into various demographic groups or psychographic groups. In another example, advertisements can be delivered to consumers that have visited specific types of web sites, consumers that are located in certain geographic areas, etc.

Attribution of conversion actions can be performed (or measured) to determine which of the advertising channels to attribute a conversion action to. For example, when a conversion action is performed, it can be matched with one or more advertisements from one or more particular advertising channels that were presented to the consumer that performed the conversion action. A conversion rate for each particular advertising channel can be determined by comparing the number of conversions attributable to that advertising channel and the total number of advertisements presented through that advertising channel.

In conducting an advertising campaign, advertisers can use multiple channels for delivering advertisements, including multiple partners within the same type of channel (e.g., multiple marketers, multiple demand-side platforms, multiple direct publishing partners, etc.). When multiple channels are being used to deliver advertisements to consumers, conversion rates calculated for the various channels, along with the cost of advertising via those channels can be used to determine a return on investment of advertising. For example, one channel may be low cost but also have a low conversion rate, while another may be higher cost and also have a higher conversion rate. Using a measurement such as return on investment ("ROI"), an advertiser can attempt to determine the cost effectiveness of different channels despite the channels having different cost structures.

Although conversion rate can be used to determine the comparative effectiveness of advertising through various channels, determining the quantitative effect of a certain advertising channel (e.g., whether the conversion was the result of the advertisement being presented to a consumer) can be problematic. For example, various advertising channels can use consumer modeling and/or behavioral targeting techniques to present advertisements to consumers that are more likely than a typical consumer to perform conversion actions (e.g., buy the advertised product, visit the advertised web site, etc.). However, the consumers being targeted may have performed the conversion action regardless of whether they were presented with an advertisement. If the consumer is likely to have performed the conversion action without being presented with the advertisement, then presenting the user with the advertisement may not be a cost effective way for an advertiser to use its advertising budget. Moreover, when judging the effectiveness of different advertising channels based on conversion rates, it is difficult to determine what quantitative effect the advertising delivered via each advertising channel has on the conversions and/or whether the conversions were actually caused by the advertising delivered via the advertising channels at all.

Accordingly, it is desirable to provide methods, systems, and media for managing online advertising campaigns based on causal conversion metrics.

SUMMARY

In accordance with various embodiments of the disclosed subject matter, methods, systems, and media for managing online advertising campaigns based on causal conversion metrics are provided.

In accordance with some embodiments of the disclosed subject matter, a method for placing advertisements is provided, the method comprising: receiving, using a hardware processor, conversion information corresponding to a plurality of consumers that were presented with an advertisement using an advertising channel; receiving advertisement viewability information indicative of a probability that each of the plurality of consumers viewed the advertisement;

determining that a subset of the plurality of consumers did not view the advertisement based on the probability; placing the plurality of consumers into a control group and a test group based on the advertisement viewability information corresponding to each of the plurality of consumers, wherein the subset of the plurality of consumers are included in the control group and all consumers presented with the advertisement using the advertising channel are included in the test group; calculating a causal conversion metric based on a comparison of the conversion information corresponding to consumers of the control group and conversion information corresponding to consumers of the test group; and determining whether to place one or more advertisements using the advertising channel based on the causal conversion metric.

In some embodiments, calculating a causal conversion metric further comprises: calculating a first conversion rate for the control group based on the conversion information corresponding to consumers included in the control group; calculating a second conversion rate for the test group based on the conversion information corresponding to consumers included in the test group; comparing the first conversion rate to the second conversion rate; and calculating a causal conversion rate based on the comparison.

In some embodiments, calculating a causal conversion metric further comprises: receiving advertisement cost information corresponding to the cost of presenting each of the plurality of users with the advertisement; calculating a first return on investment for the control group based on the conversion information corresponding to consumers included in the control group and advertising cost information corresponding to consumers included in the control group; calculating a second return on investment for the test group based on the conversion information corresponding to consumers included in the test group and advertising cost information corresponding to consumers included in the test group; comparing the first return on investment to the second return on investment; and calculating a causal return on investment based on the comparison.

In some embodiments, the method further comprises: receiving causal conversion metrics corresponding to a plurality of advertising channels other than the advertising channel, and wherein determining whether to place one or more advertisements using the advertising channel further comprises determining whether to place an advertisement on the advertising channel or one of the plurality of advertising channels based on a comparison of the causal conversion metric and the causal conversion metrics corresponding to the plurality of advertising channels.

In some embodiments, the method further comprises: receiving a budget for presenting advertisements associated with an advertising campaign; and allocating the budget among the advertising channel and the plurality of advertising channels based on the causal conversion metric and the causal conversion metrics corresponding to the plurality of advertising channels.

In some embodiments, the method further comprises: categorizing the plurality of consumers into a subset of consumers based on a contextual category of a web site with which the advertisement was presented; calculating a third causal conversion metric for the subset of consumers; comparing the third causal conversion metric to the causal conversion metric; and determining whether to place one or more advertisements on web sites in the contextual category using the advertising channel based on the comparison.

In some embodiments, determining that the subset of the plurality of consumers did not view the advertisement based on the probability comprises determining that the probability that each of the consumers in the subset viewed the advertisement is less than a threshold probability.

In accordance with some embodiments of the disclosed subject matter, a system for placing advertisements is provided, the system comprising: a hardware processor that is configured to: receive conversion information corresponding to a plurality of consumers that were presented with an advertisement using an advertising channel; receive advertisement viewability information indicative of a probability that each of the plurality of consumers viewed the advertisement; determine that a subset of the plurality of consumers did not view the advertisement based on the probability; place the plurality of consumers into a control group and a test group based on the advertisement viewability information corresponding to each of the plurality of consumers, wherein the subset of the plurality of consumers are included in the control group and all consumers presented with the advertisement using the advertising channel are included in the test group; calculate a causal conversion metric based on a comparison of the conversion information corresponding to consumers of the control group and conversion information corresponding to consumers of the test group; and determine whether to place one or more advertisements using the advertising channel based on the causal conversion metric.

In accordance with some embodiments of the disclosed subject matter a non-transitory computer-readable medium containing computer-executable instructions that, when executed by a processor, cause the processor to perform a method for placing advertisements is provided, the method comprising: receiving conversion information corresponding to a plurality of consumers that were presented with an advertisement using an advertising channel; receiving advertisement viewability information indicative of a probability that each of the plurality of consumers viewed the advertisement; determining that a subset of the plurality of consumers did not view the advertisement based on the probability; placing the plurality of consumers into a control group and a test group based on the advertisement viewability information corresponding to each of the plurality of consumers, wherein the subset of the plurality of consumers are included in the control group and all consumers presented with the advertisement using the advertising channel are included in the test group; calculating a causal conversion metric based on a comparison of the conversion information corresponding to consumers of the control group and conversion information corresponding to consumers of the test group; and determining whether to place one or more advertisements using the advertising channel based on the causal conversion metric.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

DETAILED DESCRIPTION

Figure 1:
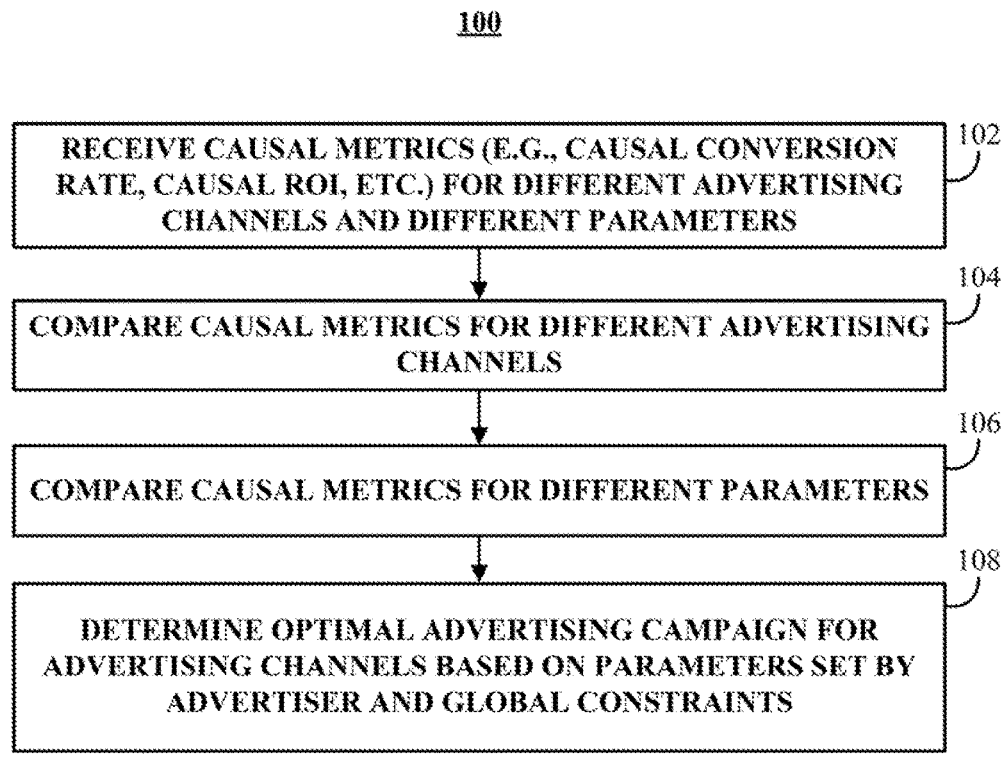
FIG. 1 shows an example of a process for managing an online advertising campaign based on causal conversion metrics in accordance with some embodiments of the disclosed subject matter.

In accordance with various embodiments, mechanisms for managing online advertising campaigns based on causal conversion metrics are provided.

In some embodiments, the mechanisms described herein can be used to manage an online advertising campaign based on one or more causal conversion metrics. For example, data regarding two groups of consumers can be received and analyzed to determine a causal return on investment ("Causal ROI") for a particular advertising channel (e.g., a particular demand-side platform, a particular exchange, a particular placement, etc.). In such an example, the first group can be a test group that includes all consumers that were presented with an advertisement (e.g., the advertisement was served to a portion of a web page loaded by the consumer's web browser, the advertisement was loaded on a portion of a web page loaded by the consumer's web browser, etc.). The second group can be a control group that includes consumers that were presented with any number of advertisements all of which were rendered on one or more web pages outside the viewport for all (or nearly all of the time) the consumer was on these pages (e.g., the advertisement was never viewable by the consumer or the advertisement was viewable by the consumer for only a short time). As used herein, a viewport can generally include the portion of a web page that is visible on the display of a consumer device, or the portion of a web page that is currently rendered by the browser on the display of the consumer device. Note that, as used herein, in some embodiments, a consumer can be presented with an advertisement without ever being able to view the advertisement.

In some embodiments, data regarding the two groups of consumers (e.g., the test group and the control group) can include data regarding advertisement viewability, data regarding quality (e.g., a rating) of the web site where the advertisement is shown, data regarding a contextual category of the website where the advertisement is shown, data regarding conversions by the consumers, data regarding advertisement placement (e.g., location), data regarding day and/or time of advertisement placement, data regarding geographic location, data regarding demographics and/or psychographics of the consumer, data regarding browsing history of the consumer, data regarding other suitable advertisement characteristics, and any other suitable data that has been gathered about the location of the advertisement, advertisement characteristics, and/or the consumer. Any suitable criterion or criteria can be used to determine whether a user is in the control group. For example, the data regarding advertisement viewability can be used to determine a probability that the consumer viewed the advertisement (or advertisements), and if the probability is below a threshold probability, the consumer can be included in the control group. As another example, if the advertisement or advertisements were never within the viewport, the consumer can be included in the control group.

In some embodiments, this data can be used to estimate a causal return on investment ("causal ROI") for advertisements placed through particular advertising channels, for example, as described below in connection with FIG. 2. The causal ROI for each channel can then be used to manage an advertising campaign for a highest causal ROI. For example, multiple channels can be used in an advertising campaign and can be periodically evaluated based on their causal ROI, where additional resources can be allocated to the channels demonstrating higher causal ROI. In some embodiments, an advertising campaign can be optimized based on causal ROI for various advertising channels. For example, a causal ROI for each advertising channel can be determined and an advertising campaign can be adjusted to direct resources (e.g., an advertising budget) to the channel or channels having the highest causal ROI.

In some embodiments, a causal conversion rate can be estimated for each advertising channel periodically. This information can be made available to the advertising channels as a way to grade their own performance and/or market their service to advertisers based on demonstrated efficacy. This information can also be made available to advertisers as a way of predicting which advertising channels are most likely to have a high causal ROI when an advertising campaign has not yet been initiated (e.g., because there is no actual data on the specific advertising campaign for analysis).

In some embodiments, a causal conversion rate, a causal ROI and/or any other causal conversion metrics can be estimated for one or more controlled parameters across all advertising channels and/or within an advertising channel. For example, one or more causal conversion metrics can be estimated for different contextual categories (e.g., sports, news, weather, gossip, entertainment, etc.) for each advertising channel. More particularly, causal metrics can be estimated for contextual categories across all advertising channels to determine if advertising on certain contextual categories results in more causal conversions than advertising on other contextual categories. Additionally or alternatively, causal ROI (or any other suitable causal metric) can be calculated within a single advertising channel for various contextual categories. This can allow for the determination of whether a particular advertising channel is more effective at causing conversions in particular contextual categories, and recommendations of contextual categories to be targeted in real time.

Similarly, in some embodiments, causal conversion metrics can be calculated across all advertising channels being used in a campaign and within each advertising channel being used in a campaign for other controlled parameters. For example, causal metrics can be calculated for a certain minimum probability that the advertisement will be viewed and/or engaged with, for time of day (e.g., work hours versus off hours), day of the week (e.g., weekday versus weekend), geographic location of consumers (e.g., based on the consumers IP address), demographic characteristics of consumers (e.g., gender, age, etc.), and/or any other suitable parameter or parameters.

In some embodiments, a predicted probability for an advertisement of a certain size on a certain web page to be viewable for more than a certain period of time (e.g., 500 milliseconds, one second, etc.) can be calculated based on past measurements of the in-view time of advertisements of the same size on the same web page. In some embodiments, a causal conversion rate, a causal ROI and/or any other causal conversion metrics can be estimated within each advertising channel for a group of all advertisements whose probability to be viewable is greater than a certain threshold value. In some embodiments, a change in the causal ROI (and/or any other suitable causal metric) can be predicted for a case where an advertiser chooses to advertise using only advertisements for which the probability to be viewable is greater than a threshold value. Additionally or alternatively, in some embodiments, causal ROI (and/or any other suitable causal metric) can be predicted for various ranges of probability for advertisements to be in view (e.g., advertisements less likely to be in view can be less expensive to buy, but may cause less conversions) such that a particular range of advertisement viewability probabilities can be chosen based on a goal or goals of a particular advertising campaign.

In some embodiments, a maximum number of viewable advertisements to present to a single consumer for a particular campaign can be set for each advertising channel. For example, an advertiser can specify that a single consumer should not be presented with more than a predetermined number of advertisements (e.g., three, four, etc.) that have been in view for at least a certain amount of time (e.g., 500 milliseconds, one second, three seconds, etc.) for the campaign in any given day (e.g., any given 24 hour period), in any given week, or in any other suitable period of the advertising campaign, through any particular channel. This can be done to inhibit using a disproportionate amount of a campaign advertising budget by repeatedly showing the same (or similar) advertisements to the same consumers. In some embodiments, the mechanisms described herein can be used to analyze how effective repeated presentation of advertisements is for any given number of advertisements. For example, conversion rates for users that were presented with four similar viewable advertisements in a day can be compared to conversion rates for users that were presented with four advertisements of which less than four were viewable advertisements. The difference in conversion rate can be estimated as the marginal effect caused by showing one extra advertisement.

In some embodiments, any or all of the information available can be used to arrive at an optimized campaign strategy for optimizing causal ROI for each period of an advertising campaign. For example, an advertiser can advertise on web pages with different minimum probabilities for an advertisement to be in view for a sufficient amount of time (e.g., 500 milliseconds, one second, etc.) on one or more advertising channels. As another example, an advertiser can elect to present advertisements only on advertisement placements (e.g., in particular locations on a web page) with a relatively high causal ROI (e.g., a causal ROI over a threshold). As yet another example, an advertiser can employ different advertising strategies on weekdays than on weekends according to the causal ROI for different advertising channels during those periods. As still another example, an advertiser can advertise more heavily to consumers that have a high causal conversion rate when repeatedly shown advertisements and less heavily for consumers that respond at lower rates when repeatedly shown advertisements (e.g., based on demographic characteristics of the consumers, psychographic characteristics of the consumers, etc.).

In some embodiments, determining an optimized advertising campaign can take into account global constraints set by the advertiser, including total budget, campaign duration, specific arrangements with advertising channels, and any other suitable constraints.

In some embodiments, an advertiser can choose an initial campaign strategy based on causal conversion rates of different advertising channels over time. Additionally or alternatively, advertising channels can be included that have been identified as having a relatively high conversion rate but a relatively low causal conversion rate using information on conversions and causal conversions. Such channels having a relatively high conversion rate but a relatively low causal conversion rate can indicate that these channels are effective at targeting consumers that are likely to convert regardless of exposure to targeted advertising. Information can be gathered about such consumers and other consumers that share similar characteristics can be inhibited from being targeted for advertisements through one or more advertising channels (e.g., advertising channels having a relatively higher causal conversion rate).

Additionally or alternatively, all of the advertising channels initially used in the campaign can be evaluated using conversion data and viewability data (and/or any other suitable data) from the current campaign periodically to re-evaluate the campaign and/or to periodically determine an optimized campaign strategy.

In some embodiments, advertising channels that are determined to have lower causal metrics can be omitted from the campaign and no longer used to present advertisements. In some embodiments, advertising channels that are determined to have lower causal metrics can still be used in the campaign but at a lower utilization level. This can allow further analysis of such an advertising channel, and if the causal performance for the channel improves, the channel can again be utilized at a higher level.

FIG. 1 shows an example 100 of a process for managing an advertising campaign using causal metrics. At 102, an advertisement management application can receive causal metrics for different advertising channels and different parameters. In some embodiments, the advertisement management application can receive a causal ROI for each advertising channel and a causal ROI for each parameter within the advertising channel. For example, the advertisement management application can receive a causal ROI for advertisements placed by a marketer and a causal ROI for advertisements placed by a demand-side platform. Additionally in such an example, the advertisement management application can receive a causal ROI for different parameters (e.g., causal ROI for advertisement placements with a minimum probability that an advertisement will be viewed and/or engaged with, causal ROI for one or more contextual categories, weekday causal ROI, working hours causal ROI, etc.).

In some embodiments, the advertisement management application can receive a causal conversion rate for each advertising channel and a causal conversion rate for each parameter within the advertising channel. For example, the advertisement management application can receive a causal conversion rate for advertisements placed directly within a content publisher and a causal conversion rate for advertisements placed by a marketer using a real-time bidding exchange. Additionally in such an example, the advertisement management application can receive a causal conversion rate for different parameters (e.g., causal conversion rate for advertisement placements with different probabilities that an advertisement in such a placement will be viewed and/or engaged with, causal conversion rate for one or more contextual category, weekday causal conversion rate, working hours causal conversion rate, etc.).

At 104, the advertisement management application can compare the causal conversion metrics received at 102 for different advertising channels. For example, causal conversion metrics can be compared for each advertising channel being utilized in an advertising campaign such as direct advertising through a publisher or publishers used in the campaign, direct advertising aggregated across all publishers used in the campaign, advertising through a marketer or marketers used in the campaign, advertising aggregated across all marketers used in the campaign, advertising through a demand side platform or demand side platforms used in the campaign, advertising aggregated across all demand side platforms used in the campaign, etc.

At 106, the advertisement management application can compare the causal conversion metrics received at 102 for different parameters. For example, causal conversion metrics can be compared for comparable parameters, such as different probabilities that an advertisement was likely to have been viewed by a consumer, different times of day when the advertisement was presented to the consumer, different days when the advertisement was presented to the consumer, etc.

At 108, the advertisement management application can determine a distribution of advertising amongst one or more advertising channels based on the comparisons at 104 and/or 106, based on targeting parameters set by the advertiser (e.g., demographic characteristics, psychographic characteristics, browsing history characteristics, etc.), and/or based on global constraints set by the advertiser (e.g., budget for campaign, duration of campaign, agreements with various advertising channels, etc.). In some embodiments, a selection and/or utilization level of one or more of the advertising channels can be made based on an expected causal metric for each of the advertising channels, where the expected causal metric is a projection of a causal metric received at 102 into the future.

In some embodiments, constraints can be set by an advertiser during an initial set-up phase of an advertising campaign, and/or can be set or adjusted at any other suitable time during an advertisements campaign. For example, a budget for a particular advertising campaign can be received from an advertiser which can include a daily budget, weekly budget, etc., and/or a budget for the duration of the campaign (e.g., a global budget).

In some embodiments, a regression model can be used for calculating and analyzing causal conversion metrics as described below. Additionally or alternatively, in some embodiments, a sample size of the test group and/or control group being considered can be used when calculating and/or analyzing causal conversion metrics. For example, data having smaller sample size can be discounted and/or downweighted when calculating and/or analyzing a causal conversion metric related to the data. As another example, a statistical significance of a causal metric derived from data can be determined, and such information can be used when using the calculated causal conversion metric for managing an online advertising campaign. As a more particular example, causal conversion metrics calculated for advertisements presented using a particular advertising channel on web sites having various contextual categories may be more likely to be subject to random noise (and therefore be less likely to reveal a significant result) than the same causal conversion metric calculated for the advertising channel as a whole (e.g., across all contextual categories).

In some embodiments, the mechanisms described herein can determine a probability (i.e., a likelihood, a possibility, etc.) that a conversion is caused by an advertisement based at least in part on whether the advertisement was viewable by the consumer that performed a conversion action. More particularly, when a consumer is presented with an advertisement in an advertisement placement on a web site or web page, information on whether the advertisement is within a viewport of the browser can be determined. If an advertisement is presented to a consumer, and it is known that the consumer was unable to view the advertisement because the advertisement was not within the viewport, then the consumer can be considered to have not viewed the advertisement.

In some embodiments, a conversion rate for a group of consumers for a particular advertising campaign can be calculated by dividing the number of conversion actions performed in the group by the total number of advertisements presented to the group.

In some embodiments, a cost per acquisition ("CPA") metric can be calculated by dividing the average cost of presenting an advertisement to a consumer by the conversion rate.

In some embodiments, a return on investment ("ROI") metric can be calculated by dividing an extra amount of sales earned attributable to advertising divided by the total amount spent on advertising. Tracking the amount earned per conversion can assist in calculating ROI.

Each of these metrics can be calculated for an entire campaign, for each advertising channel of a campaign, for individual advertisements, or any other suitable granularity at which information is available.

In some embodiments, a causal attribution model can be used to account for the influence of confounding factors, such as non-representative users who spend little time viewing advertisements. More particularly, in some embodiments, the causal attribution model can be a regression model that can be trained using a set of data on consumers presented with advertisements, and conversion actions performed by these users. Parameters of the data used to construct the model can include viewability metrics of the advertisement to the consumer, user engagement metrics of whether a conversion is attributable to the advertisement, browsing history of the consumer, demographic characteristics of the consumer, psychographic characteristics of the consumer, categories of web sites that the consumer visits, a category of a site that the advertisement was placed on, etc.

In some embodiments, the dependent variable of the regression model can be the probability of a consumer performing a conversion action. Alternatively, the dependent variable can be an expected conversion rate.

In some embodiments, a regression model can be trained on all impressions presented to consumers for which it can be determined whether the consumer could view the advertisement or could not have viewed the advertisement, and all measured conversions performed by the consumers presented with advertisements. In one example, impressions presented to consumers where it is unclear whether the consumer could have or could not have viewed the advertisement (e.g., where a probability for whether the consumer is likely to have viewed the advertisement cannot be determined) can be excluded when training the regression model.

In some embodiments, the regression model can be applied to calculate the conversion rate for advertisements presented to consumers in the control group for a particular advertising channel (e.g., consumers that are known to have not viewed the advertisement—or viewed the advertisement for only a brief time—even though the advertisement was presented on a page accessed by the consumer).

In some embodiments, the regression model can be based at least in part on the assumption that the only advertising campaign parameter distinguishing consumers is the total number of advertisements shown to the consumer within an advertising channel. Additionally or alternatively, the regression model can be based on factors affecting a probability of conversion by the consumer and/or a probability that the consumer is presented with a viewable advertisement. Additionally, in some embodiments, the regression model can further be based on the assumption that the advertising channels do not have the ability to distinguish between advertisements that can or cannot be viewed by consumers. In such embodiments, the conversion rate of consumers within the control group can be calculated by a regression model where a total number of consumers with N impressions per consumer within the control group is equal to a total number of consumers with N impressions per consumer in the test group.

Additionally or alternatively, the regression model can be applied to calculate a conversion rate for advertisements presented to consumers in the test group (e.g., all consumers that were presented with the advertisement) for the particular advertising channel.

One or more of these conversion rates can be compared with each other and/or with numerically calculated conversion rates (e.g., for the control group or test group, for the particular advertising channel, for all advertising channels, etc.). This comparison can be used to calculate a causal return on investment (causal ROI) for each particular advertising channel by comparing a causal conversion rate (e.g., a conversion rate change due to the advertisements being viewed by consumers) and/or revenue generated form causal conversion with the costs of advertisement placements using the particular advertising channel. It should be noted that the causal return on investment can be negative, if for some reason viewing an advertisement made a consumer less likely to perform a conversion action and/or if some other factor resulted in consumers that viewed the advertisement being less likely to perform a conversion action than consumers that did not view the advertisement.

Figure 2:
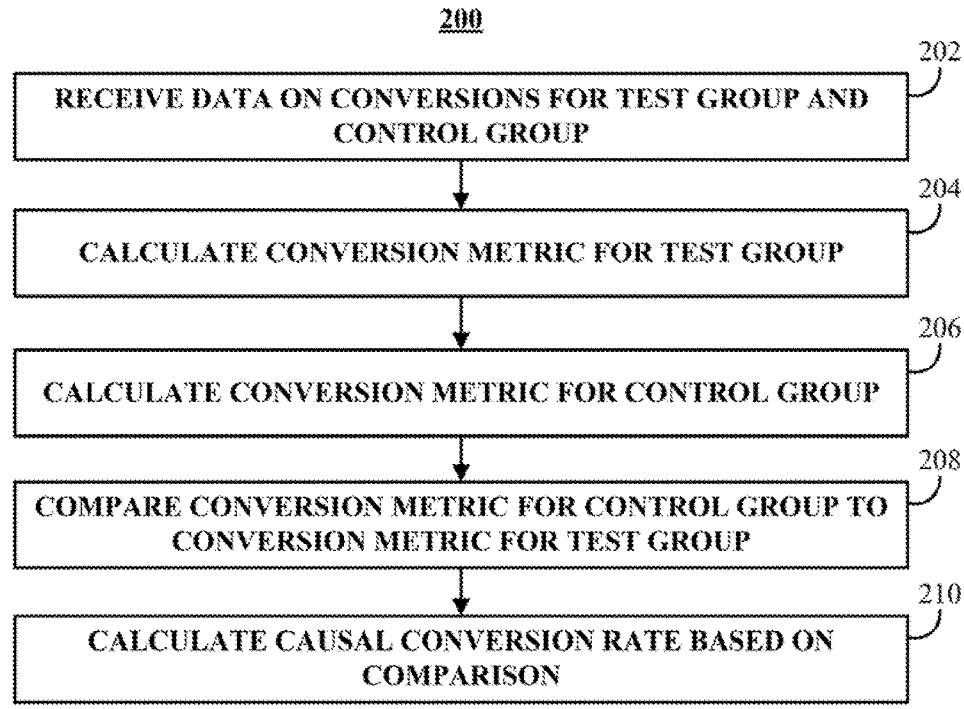
FIG. 2 shows an example of a process for calculating a causal conversion metric in accordance with some embodiments of the disclosed subject matter.

Turning to FIG. 2, an example 200 of a process for calculating a causal conversion rate is shown in accordance with some embodiments. At 202, an advertisement management application can receive data on conversions for a test group and a control group. In some embodiments, the test group includes consumers that were presented with an advertisement where the advertisement was either viewable or not viewable by the consumers. In some embodiments, the control group includes consumers that were presented with an advertisement (or advertisements) where the advertisement (or advertisements) was not viewable to the consumer. In some embodiments, the data received by the advertisement management application at 202 can include a number of times an advertisement was presented to a consumer, a viewability metric of the advertisement presented to the consumer for each presentation, whether a conversion resulted from any of the presentations of the advertisement to the consumer, and any other suitable data regarding the consumer. Data on conversions and advertisement presentation for each consumer can be aggregated for: a single advertising channel; individual advertisements; across all advertising channels if the information for particular consumers is tracked across different advertising channels; and/or any other suitable technique for aggregating the data.

At 204, the advertisement management application can calculate one or more conversion metrics (e.g., a conversion rate, a return on investment, etc.) for the test group. In some embodiments, a conversion rate for the test group can be calculated using any suitable technique, including the techniques described herein. For example, a number of consumers that performed a conversion action can be compared to a number of advertisements presented to consumers. Additionally or alternatively, a return on investment can be calculated using any suitable technique, including the techniques described herein. For example, an amount of sales attributable to advertisements can be compared to an amount spent on advertisements. Additionally or alternatively, any suitable conversion metric can be calculated. For example, cost per acquisition ("CPA"), etc.

At 206, the advertisement management application can calculate a conversion metric (e.g., a conversion rate, a return on investment, etc.) for the control group. In some embodiments, the conversion metric calculated at 206 can be the same conversion metric calculated at 204, except that conversion information regarding the control group can be used rather than conversion information for the test group.

At 208, the conversion metric for the control group calculated at 206 can be compared to the conversion metric for the test group calculated at 204. In some embodiments, a conversion rate calculated for the control group can be subtracted from a conversion rate calculated for the test group. For example, this can indicate the conversion actions that are determined to be caused by viewing an advertisement and not a conversion action that the consumer would have likely performed if they had not viewed the advertisement.

At 210, a causal conversion metric can be calculated based on the comparison. In some embodiments, the causal conversion metric can be a causal return on investment ("causal ROI"). For example, a causal conversion rate can be found by comparing a conversion rate for the control group and a conversion rate for the test group. More particularly, the conversion rate for the control group can be subtracted from the conversion rate for the test group and the result can be taken as the causal conversion rate. This causal conversion rate can then be used to calculate the causal ROI. In one example, causal ROI can be calculated by dividing sales attributable to advertising by the total amount spent on advertising as shown by the following equation:

$$\text{Casual } ROI = \frac{\text{Sales Attributable to Advertising}}{\text{Money Spent on Advertising}} \quad (1)$$

Using the causal conversion rate, the sales attributable to advertising can be found by multiplying the total number of conversions ("Conversions"), the causal conversion factor ("CCF"), defined as the fraction of casual conversions among all conversions, and the average sales per conversion ("Avg$"), as shown in the following equation:

$$\text{Sales Attributable to Advertising} = \text{Conversions} \times \text{CCF} \times \text{Avg\$} \quad (2)$$

substituting equation (2) into equation (1) yields the following equation for finding Causal ROI:

$$\text{Casual } ROI = \frac{\text{Conversions} \times CCF \times Avg\$}{\text{Money Spent on Advertising}} \quad (3)$$

In some cases, advertising can influence an amount that a consumer spends when the consumer performs a conversion action even if the user is likely to have performed a conversion action if not shown an advertisement. Therefore, the sales attributable to advertising can be calculated to take into account the fact that sales to consumers shown advertisements may be higher than sales to consumers not shown advertisements. In such a case, the average sales used in calculating causal ROI can be the average sale to all consumers that viewed an advertisement.

Figure 3:
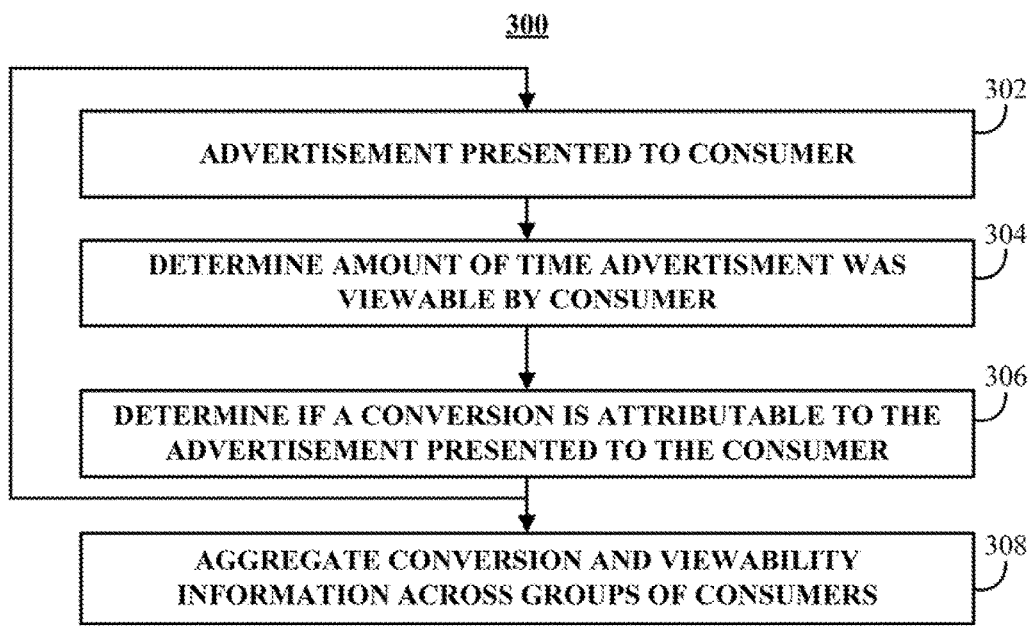
FIG. 3 shows an example of a process for determining conversion and viewability information for advertisements presented to consumers in accordance with some embodiments of the disclosed subject matter.

FIG. 3 shows an example 300 of a process for determining data used to calculate a causal conversion rate in accordance with some embodiments. At 302, an advertisement can be presented to a consumer. In some embodiments, this can be a direct advertisement placed on a specific web site by the advertiser, an advertisement placed as the result of a transaction involving a real-time bidding exchange, or any other suitable technique for presenting an advertisement.

At 304, the advertisement management application can receive information associated with the advertisement placed at 302 and can use this information to determine an amount of time that the advertisement was viewable by the consumer. In some embodiments, an amount of time that an advertisement is viewable by a consumer can be determined based on data received from monitoring code that is inserted into the advertisement presented at 302. Such monitoring code can send data regarding various properties of a consumer's web browser to the advertisement management application. For example, the monitoring code can send data regarding a position of the advertisement, a viewport of the web page loaded by the browser, an advertisement size, etc. This information can be used to determine if the advertisement was in view in the viewport of the web page rendered by the browser and/or how long the advertisement was within the viewport of the web page rendered by the browser. Features for determining an amount of time that an advertisement was viewable by a consumer are further described, for example, in commonly owned, commonly assigned U.S. patent application Ser. No. 13/614,878, which is hereby incorporated by reference herein in its entirety.

At 306, the advertisement management application can determine if a conversion is attributable to the advertisement presented to the consumer. Any suitable techniques for determining whether a conversion has occurred can be used.

In some embodiments, having calculated whether the advertisement was viewable and whether there is a conversion attributable to the advertisement, the advertisement management application can continue to gather information about advertisement placements and conversions at 302 and can move to 308 where the advertisement management application can aggregate the conversion and viewability data for the advertisement presented at 302 with conversion and viewability data for other advertisements in the same campaign, other advertisements presented using the same advertising channel, according to whether the consumer is in the control group, using any other suitable basis for aggregating such data, and/or any suitable combination thereof. This information can be used by the advertising management application to calculate causal conversion rates in process 200.

Figure 4:
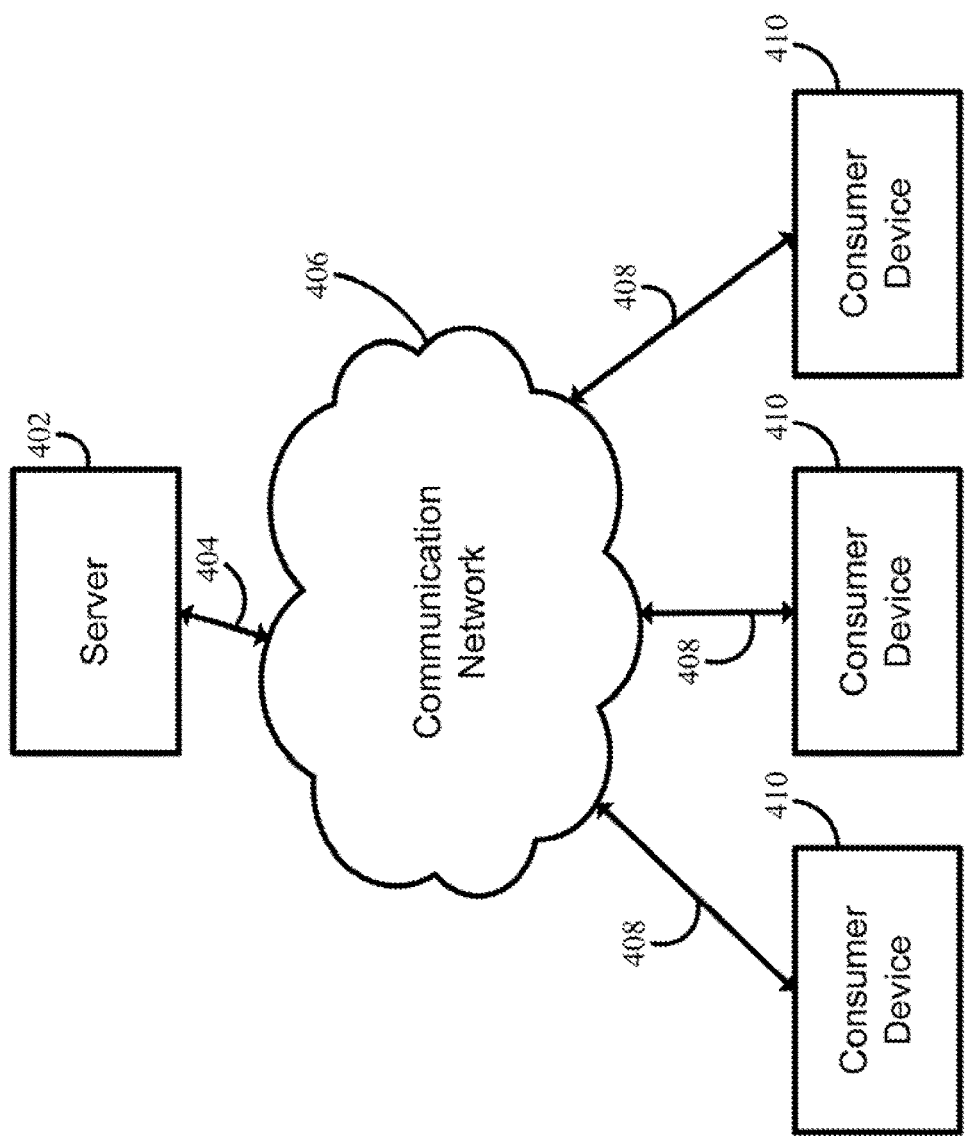
FIG. 4 shows a schematic diagram of an illustrative system suitable for implementation of mechanisms described herein for managing an online advertising campaign using causal conversion metrics in accordance with some embodiments of the disclosed subject matter.

FIG. 4 shows an example of a generalized schematic diagram of a system 400 on which the mechanisms for managing online advertising campaigns based on causal conversion metrics described herein can be implemented in accordance with some embodiments. As illustrated, system 400 can include one or more consumer devices 410. Consumer devices 410 can be local to each other or remote from each other. Consumer devices 410 can be connected by one or more communications links 408 to a communications network 406 that can be linked via a communications link 404 to a server 402.

System 400 can include one or more servers 402. Server 402 can be any suitable server for executing the advertisement management application, such as a processor, a computer, a data processing device, or any suitable combination of such devices. For example, the advertisement management application can be distributed into multiple backend components and multiple frontend components or interfaces. In a more particular example, backend components, such as data collection and data distribution can be performed on one or more servers 402.

More particularly, for example, each of the consumer devices 410 and server 402 can be any of a general purpose device such as a computer or a special purpose device such as a client, a server, etc. Any of these general or special purpose devices can include any suitable components such as a hardware processor (which can be a microprocessor, digital signal processor, a controller, etc.), memory, communication interfaces, display controllers, input devices, etc. For example, consumer device 410 can be implemented as a personal computer, a smartphone, a tablet computer, a personal data assistant (PDA), a multimedia terminal, a mobile telephone, a set-top box, a television, a game console, etc.

Communications network 406 can be any suitable computer network or combination of networks including the Internet, an intranet, a wide-area network ("WAN"), a local-area network ("LAN"), a wireless network, a digital subscriber line ("DSL") network, a frame relay network, an asynchronous transfer mode ("ATM") network, a virtual private network ("VPN"), etc. Communications links 404 and 408 can be any communications links suitable for communicating data between consumer devices 410 and server 402, such as network links, dial-up links, wireless links, hard-wired links, any other suitable communications links, or any suitable combination of such links. Consumer devices 410 can enable a user to load a web page that causes features mechanisms described herein to be accessed. Consumer devices 410 and server 402 can be located at any suitable location.

Figure 5:
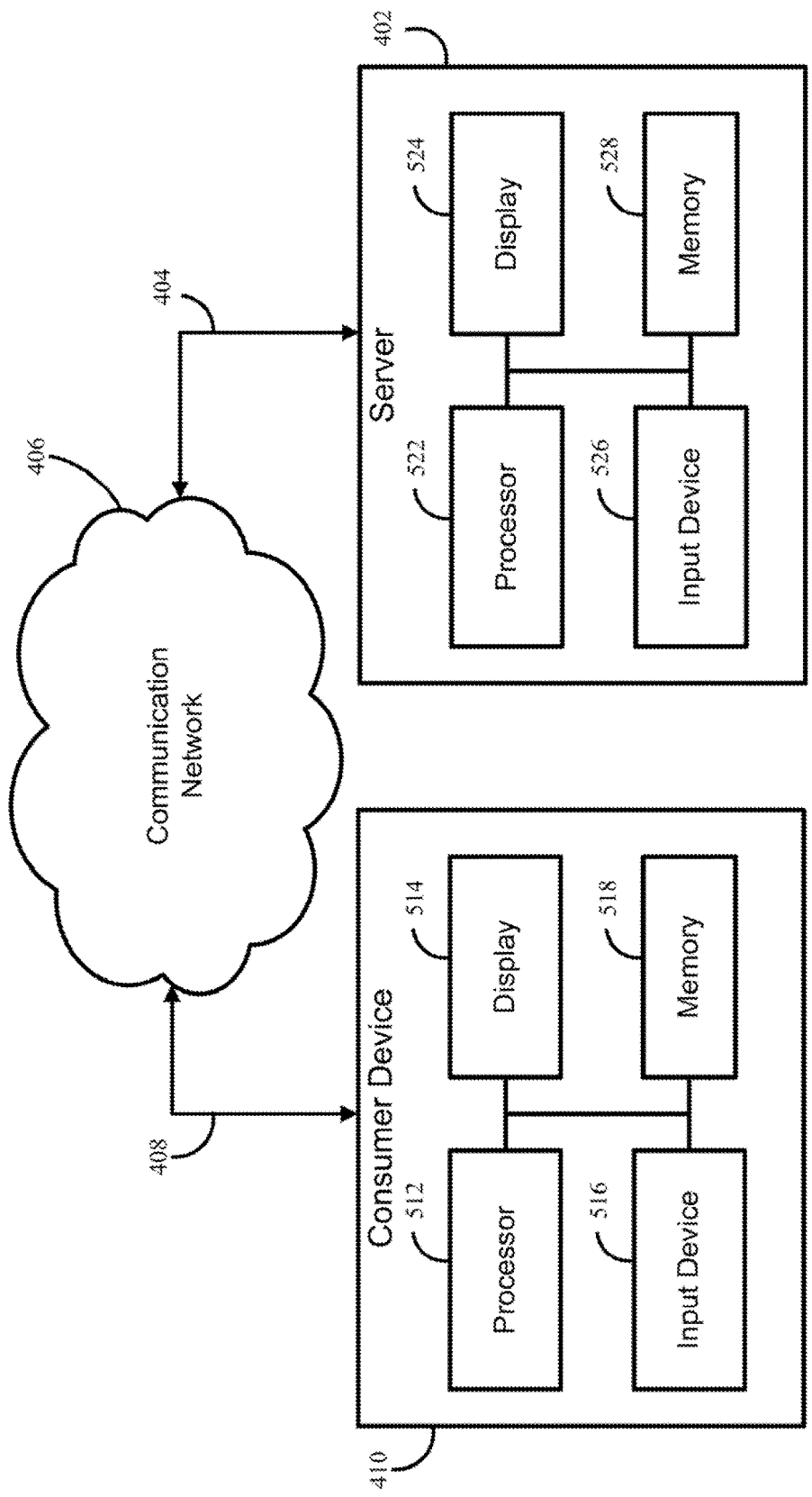
FIG. 5 shows a detailed example of a server and one of the consumer devices of FIG. 4 that can be used in accordance with some embodiments of the disclosed subject matter.

FIG. 5 illustrates an example of hardware 400 where server 402 and one of consumer devices 410 depicted in FIG. 4 are illustrated in more detail. Referring to FIG. 5, consumer device 410 can include a processor 512, a display 514, an input device 516, and memory 518, which can be interconnected. In some embodiments, memory 518 can include a storage device (such as a computer-readable medium) for storing a computer program for controlling processor 512.

Processor 512 can use the computer program to present on display 514 a browser window that loads a web page with an advertisement and/or other data received through communications link 408 and commands and values transmitted by a user of consumer device 410. It should also be noted that data received through communications link 408 or any other communications links can be received from any suitable source. Display 514 can be a flat panel display, a cathode ray tube display, a projector, a touch screen, a speaker(s), and/or any other suitable display and/or presentation devices. Input device 516 can be a computer keyboard, a computer mouse, a microphone, a touchpad, a voice recognition circuit, a touchscreen, and/or any other suitable input device.

Server 402 can include processor 522, display 524, input device 526, and memory 528, which can be interconnected. In some embodiments, memory 528 can include a storage device for storing data received through communications link 404 or through other links, and can also receive commands and/or values transmitted by one or more users (e.g., advertisers, consumers, marketers, system administrators, etc.). The storage device can further include a server program for controlling processor 522.

Hardware processor 522 can use the server program to communicate with consumer devices 410, as well as provide access to and/or copies of the advertising management application. It should also be noted that data received through communications link 404 or any other communications links can be received from any suitable source. In some embodiments, hardware processor 522 can send and receive data through communications link 404 or any other communications links using, for example, a transmitter, receiver, transmitter/receiver, transceiver, or any other suitable communication device. In some embodiments, hardware processor 522 can receive commands and/or values transmitted by one or more users. Display 524 can be a flat panel display, a cathode ray tube display, a projector, a touch screen, a speaker(s), and/or any other suitable display and/or presentation devices. Input device 526 can be a computer keyboard, a computer mouse, a microphone, a touchpad, a voice recognition circuit, a touchscreen, and/or any other suitable input device.

In some implementations, the mechanisms described herein can include server-side software, client-side software, server-side hardware, client-side hardware, firmware, or any suitable combination thereof. For example, these mechanisms can encompass one or more Web pages or Web page portions (e.g., via any suitable encoding, such as Hyper Text Markup Language ("HTML"), Dynamic Hyper Text Markup Language ("DHTML"), Extensible Markup Language ("XML"), JavaServer Pages ("JSP"), Active Server Pages ("ASP"), Cold Fusion, or any other suitable approaches). As another example, these mechanisms can encompass a computer program that causes a processor to execute the mechanisms described herein. In a more particular example, these mechanisms can encompass a computer program written in a programming language recognizable by consumer device 410 and/or server 402 that is executing the mechanisms (e.g., a program written in a programming language, such as, Java, C, Objective-C, C++, C#, JavaScript, Visual Basic, HTML, XML, ColdFusion, any other suitable approaches, or any suitable combination thereof).

The mechanisms described herein can be used in a variety of applications. For example, these mechanisms can be used by an advertiser to optimize an advertising campaign by determining which advertising channels are causing conversion actions, as opposed to targeting consumers that will likely convert without advertising. As another example, these mechanisms can be used by an advertiser to determine which advertisement placements and/or which advertisements are causing the consumers to take conversion actions. As yet another example, the mechanisms described herein can be used by advertising channels to determine which consumers to target based on conversions caused rather than an inference that a conversion was caused.

Accordingly, methods, systems, and media for managing online advertising campaigns based on causal conversion metrics are provided.

In some embodiments, any suitable computer readable media can be used for storing instructions for performing the processes described herein. For example, in some embodiments, computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

It should be understood that the above described steps of the processes of FIGS. 1-3 can be executed or performed in any order or sequence not limited to the order and sequence shown and described in the figures. Also, some of the above steps of the processes of FIGS. 1-3 can be executed or performed substantially simultaneously where appropriate or in parallel to reduce latency and processing times.

It should also be noted that, as used herein, the term mechanism can encompass hardware, software, firmware, or any suitable combination thereof.

Although the invention has been described and illustrated in the foregoing illustrative implementations, it is understood that the present disclosure has been made only by way of example, and that numerous changes in the details of implementation of the invention can be made without departing from the spirit and scope of the invention, which is limited only by the claims that follow. Features of the disclosed implementations can be combined and rearranged in various ways.

What is claimed is:

1. A method for placing online advertisements, the method comprising:
   receiving, using a hardware processor, an advertising budget for a particular portion of an online advertising campaign;
   causing, using the hardware processor, monitoring code to be loaded in association with advertisements presented as part of the online advertising campaign, wherein the monitoring code is configured to determine advertisement viewability information indicative of a probability that an advertisement was viewable to a consumer based at least in part on a comparison of an amount of time that the advertisement of a particular size on a particular web page was within a viewport of a web browser with past measurements of in-view time of advertisements of the particular size on the particular webpage;
   (a) receiving, using the hardware processor, conversion information corresponding to a plurality of consumers each associated with one of a plurality of consumer devices that each loaded an advertisement as part of a web page loaded by the web browser executed by that consumer device based on instructions to load the advertisement received using a first online advertising channel, wherein the advertisement was placed using the first online advertising channel as part of the online advertising campaign according to an initial allocation amongst a plurality of online advertising channels including the first online advertising channel;
   (b) receiving advertisement viewability information indicative of a probability that each of the plurality of consumers viewed the advertisement, wherein the advertisement viewability information was sent by the monitoring code loaded in association with the advertisement loaded as part of the web page by the web browser executed by the consumer device corresponding to that consumer;

(c) determining that a subset of the plurality of consumers did not view the advertisement based on the probability that the advertisement was viewed;

(d) placing the plurality of consumers into a control group and a test group based on the advertisement viewability information corresponding to each of the plurality of consumers, wherein the subset of the plurality of consumers are included in the control group and all consumers associated with a consumer device that loaded the advertisement based on instructions received using the first online advertising channel are included in the test group;

(e) calculating a causal conversion metric for the first online advertising channel based on a comparison of the conversion information corresponding to consumers of the control group and conversion information corresponding to consumers of the test group;

(f) repeating (a) through (e) for each of the plurality of online advertising channels other than the first online advertising channel;

allocating the budget among the plurality of online advertising channels based on the causal conversion metric corresponding to the first online advertising channel and the causal conversion metrics corresponding to the plurality of online advertising channels other than the first online advertising channel; and transmitting instructions to at least one remote computing device indicating in what proportion advertisements for the campaign are to be placed using each of the plurality of online advertising channels based at least in part on the causal conversion metric and the budget, wherein the proportion is based on the allocation of the budget.

2. The method of claim 1, wherein calculating a causal conversion metric further comprises:

calculating a first conversion rate for the control group based on the conversion information corresponding to consumers included in the control group;

calculating a second conversion rate for the test group based on the conversion information corresponding to consumers included in the test group;

comparing the first conversion rate to the second conversion rate; and calculating a causal conversion rate based on the comparison.

3. The method of claim 1, wherein calculating a causal conversion metric further comprises:

receiving advertisement cost information corresponding to the cost of presenting each of the plurality of users with the advertisement;

calculating a first return on investment for the control group based on the conversion information corresponding to consumers included in the control group and advertising cost information corresponding to consumers included in the control group;

calculating a second return on investment for the test group based on the conversion information corresponding to consumers included in the test group and advertising cost information corresponding to consumers included in the test group;

comparing the first return on investment to the second return on investment; and calculating a causal return on investment based on the comparison.

4. The method of claim 1, wherein allocating the budget further comprises determining whether to place more advertisements on the first online advertising channel or one of the plurality of online advertising channels other than the first online advertising channel based on a comparison of the causal conversion metric corresponding to the first online advertising channel and the causal conversion metrics corresponding to the plurality of advertising channels other than the first online advertising channel.

5. The method of claim 1, further comprising:

categorizing the plurality of consumers into a second subset of consumers based on a contextual category of a web site with which the advertisement was presented;

calculating a third causal conversion metric for the second subset of consumers;

comparing the third causal conversion metric to the causal conversion metric; and determining whether to place one or more advertisements on web sites in the contextual category using the advertising channel based on the comparison.

6. The method of claim 1, wherein determining that the subset of the plurality of consumers did not view the advertisement based on the probability that the advertisement was viewed comprises determining that the probability that the advertisement was viewed is less than a threshold probability.

7. A system for placing advertisements, the system comprising:

a hardware processor that is configured to:

receive an advertising budget for a particular portion of an online advertising campaign;

cause monitoring code to be loaded in association with advertisements presented as part of the online advertising campaign, wherein the monitoring code is configured to determine advertisement viewability information indicative of a probability that an advertisement was viewable to a consumer based at least in part on a comparison of an amount of time that the advertisement of a particular size on a particular web page was within a viewport of a web browser with past measurements of in-view time of advertisements of the particular size on the particular webpage;

(a) receive conversion information corresponding to a plurality of consumers each associated with one of a plurality of consumer devices that each loaded an advertisement as part of a web page loaded by the web browser executed by that consumer device based on instructions to load the advertisement received using an advertising channel, wherein the advertisement was placed using the first online advertising channel as part of the online advertising campaign according to an initial allocation amongst a plurality of online advertising channels including the first online advertising channel;

(b) receive advertisement viewability information indicative of a probability that each of the plurality of consumers viewed the advertisement, wherein the advertisement viewability information was sent by the monitoring code loaded in association with the advertisement loaded as part of the web page by the web browser executed by the consumer device corresponding to that consumer;

(c) determine that a subset of the plurality of consumers did not view the advertisement based on the probability that the advertisement has been viewed;

(d) place the plurality of consumers into a control group and a test group based on the advertisement viewability information corresponding to each of the plurality of consumers, wherein the subset of the plurality of consumers are included in the control group and all consumers associated with a consumer device that loaded the advertisement based on instructions received using the first online advertising channel are included in the test group;

(e) calculate a causal conversion metric for the first online advertising channel based on a comparison of the conversion information corresponding to consumers of the control group and conversion information corresponding to consumers of the test group;

(f) repeat (a) through (e) for each of the plurality of online advertising channels other than the first online advertising channel;

allocate the budget among the plurality of online advertising channels based on the causal conversion metric corresponding to the first online advertising channel and the causal conversion metrics corresponding to the plurality of online advertising channels other than the first online advertising channel; and transmit instructions to at least one remote computing device indicating in what proportion advertisements for the campaign are to be placed using each of the plurality of online advertising channels based at least in part on the causal conversion metric and the budget, wherein the proportion is based on the allocation of the budget.

8. The system of claim 7, wherein the hardware processor is further configured to:
calculate a first conversion rate for the control group based on the conversion information corresponding to consumers included in the control group;
calculate a second conversion rate for the test group based on the conversion information corresponding to consumers included in the test group;
compare the first conversion rate to the second conversion rate; and
calculate a causal conversion rate based on the comparison.

9. The system of claim 7, wherein the hardware processor is further configured to:
receive advertisement cost information corresponding to the cost of presenting each of the plurality of users with the advertisement;
calculate a first return on investment for the control group based on the conversion information corresponding to consumers included in the control group and advertising cost information corresponding to consumers included in the control group;
calculate a second return on investment for the test group based on the conversion information corresponding to consumers included in the test group and advertising cost information corresponding to consumers included in the test group;
compare the first return on investment to the second return on investment; and
calculate a causal return on investment based on the comparison.

10. The system of claim 7, wherein the hardware processor is further configured to determine whether to place more advertisements on the first online advertising channel or one of the plurality of online advertising channels other than the first online advertising channel based on a comparison of the causal conversion metric corresponding to the first online advertising channel and the causal conversion metrics corresponding to the plurality of advertising channels other than the first online advertising channel.

11. The system of claim 7, wherein the hardware processor is further configured to:
categorize the plurality of consumers into a second subset of consumers based on a contextual category of a web site with which the advertisement was presented;
calculate a third causal conversion metric for the second subset of consumers;
compare the third causal conversion metric to the causal conversion metric; and
determine whether to place one or more advertisements on web sites in the contextual category using the advertising channel based on the comparison.

12. The system of claim 7, wherein the hardware processor is further configured to determine that the probability that the advertisement was viewed is less than a threshold probability.

13. A non-transitory computer-readable medium containing computer-executable instructions that, when executed by a processor, cause the processor to perform a method for placing advertisements, the method comprising:
receiving an advertising budget for a particular portion of an online advertising campaign;
causing monitoring code to be loaded in association with advertisements presented as part of the online advertising campaign, wherein the monitoring code is configured to determine advertisement viewability information indicative of a probability that an advertisement was viewable to a consumer based at least in part on a comparison of an amount of time that the advertisement of a particular size on a particular web page was within a viewport of a web browser with past measurements of in-view time of advertisements of the particular size on the particular webpage;

(a) receiving conversion information corresponding to a plurality of consumers each associated with one of a plurality of consumer devices that each loaded an advertisement as part of a web page loaded by the web browser executed by that consumer device based on instructions to load the advertisement received using a first online advertising channel, wherein the advertisement was placed using the first online advertising channel as part of the online advertising campaign according to an initial allocation amongst a plurality of online advertising channels including the first online advertising channel;

(b) receiving advertisement viewability information indicative of a probability that each of the plurality of consumers viewed the advertisement, wherein the advertisement viewability information was sent by the monitoring code loaded in association with the advertisement loaded as part of the web page by the web browser executed by the consumer device corresponding to that consumer;

(c) determining that a subset of the plurality of consumers did not view the advertisement based on the probability that the advertisement was viewed;

(d) placing the plurality of consumers into a control group and a test group based on the advertisement viewability information corresponding to each of the plurality of consumers, wherein the subset of the plurality of consumers are included in the control group and all consumers associated with a consumer device that loaded the advertisement based on instructions received using the first online advertising channel are included in the test group;

(e) calculating a causal conversion metric for the first online advertising channel based on a comparison of the conversion information corresponding to consumers of the control group and conversion information corresponding to consumers of the test group;

(f) repeating (a) through (e) for each of the plurality of online advertising channels other than the first online advertising channel;

allocating the budget among the plurality of online advertising channels based on the causal conversion metric corresponding to the first online advertising channel and the causal conversion metrics corresponding to the plurality of online advertising channels other than the first online advertising channel; and transmitting instructions to at least one remote computing device indicating in what proportion advertisements for the campaign are to be placed using each of the plurality of online advertising channels based at least in part on the causal conversion metric and the budget, wherein the proportion is based on the allocation of the budget.

14. The non-transitory computer-readable medium of claim 13, wherein calculating a causal conversion metric further comprises:

calculating a first conversion rate for the control group based on the conversion information corresponding to consumers included in the control group;

calculating a second conversion rate for the test group based on the conversion information corresponding to consumers included in the test group;

comparing the first conversion rate to the second conversion rate; and calculating a causal conversion rate based on the comparison.

15. The non-transitory computer-readable medium of claim 13, wherein calculating a causal conversion metric further comprises:

receiving advertisement cost information corresponding to the cost of presenting each of the plurality of users with the advertisement;

calculating a first return on investment for the control group based on the conversion information corresponding to consumers included in the control group and advertising cost information corresponding to consumers included in the control group;

calculating a second return on investment for the test group based on the conversion information corresponding to consumers included in the test group and advertising cost information corresponding to consumers included in the test group;

comparing the first return on investment to the second return on investment; and calculating a causal return on investment based on the comparison.

16. The non-transitory computer-readable medium of claim 13, wherein allocating the budget further comprises determining whether to place more advertisements on the first online advertising channel or one of the plurality of online advertising channels other than the first online advertising channel based on a comparison of the causal conversion metric corresponding to the first online advertising channel and the causal conversion metrics corresponding to the plurality of advertising channels other than the first online advertising channel.

17. The non-transitory computer-readable medium of claim 13, wherein the method further comprises:

categorizing the plurality of consumers into a second subset of consumers based on a contextual category of a web site with which the advertisement was presented;

calculating a third causal conversion metric for the second subset of consumers;

comparing the third causal conversion metric to the causal conversion metric; and determining whether to place one or more advertisements on web sites in the contextual category using the advertising channel based on the comparison.

18. The non-transitory computer-readable medium of claim 13, wherein determining that the subset of the plurality of consumers did not view the advertisement based on the probability that the advertisement was viewed comprises determining that the probability that the advertisement was viewed is less than a threshold probability.

* * * * *